(12) United States Patent
Umeda (10) Patent No.: US 12,367,706 B2
(45) Date of Patent: Jul. 22, 2025

(54) MASTER FACE IMAGE REGISTRATION APPARATUS, REGISTRATION METHOD, PROGRAM, AND RECORDING MEDIUM

(71) Applicant: NEC Solution Innovators, Ltd., Tokyo (JP)

(72) Inventor: Kazuhide Umeda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 874 days.

(21) Appl. No.: 17/273,484

(22) PCT Filed: Aug. 29, 2019

(86) PCT No.: PCT/JP2019/033824
§ 371 (c)(1),
(2) Date: Oct. 27, 2021

(87) PCT Pub. No.: WO2020/050119
PCT Pub. Date: Mar. 12, 2020

(65) Prior Publication Data
US 2022/0067348 A1 Mar. 3, 2022

(30) Foreign Application Priority Data
Sep. 6, 2018 (JP) .................................. 2018-167127

(51) Int. Cl.
*G06V 40/16* (2022.01)
*G06F 18/22* (2023.01)

(52) U.S. Cl.
CPC ............ *G06V 40/172* (2022.01); *G06F 18/22* (2023.01); *G06V 40/168* (2022.01)

(58) Field of Classification Search
None
See application file for complete search history.

(56) References Cited

U.S. PATENT DOCUMENTS 8,634,599 B2 * 1/2014 Sahin ...................... G06F 21/32
382/218
2004/0165754 A1 8/2004 Tabata
(Continued)

FOREIGN PATENT DOCUMENTS

JP 2011-210049 A 10/2011
JP 2013-097760 A 5/2013
(Continued)

OTHER PUBLICATIONS

Yang, Jianwei, et al. "Person-specific face antispoofing with subject domain adaptation." IEEE Transactions on Information Forensics and Security 10.4 (2015): 797-809. (Year: 2015).*
(Continued)

*Primary Examiner* — Matthew C Bella
*Assistant Examiner* — Johnny B Duong (57) ABSTRACT

A candidate face image and attribute information of each imaging attribute item are acquired. For each imaging attribute item, attribute information is extracted from a database that stores attribute information that has a degree of participation in false authentication greater than a participation degree threshold, among attribute information of analyzed imaging attribute items of analyzed master face images that resulted in false authentication in face image authentication. For each imaging attribute item, whether or not the extracted attribute information has a similarity to the acquired attribute information of the each imaging attribute item greater than a similarity threshold is determined. For each imaging attribute item for which the similarity is greater than the similarity threshold, a weight is assigned. A total score is calculated by summing the weights. When the total score satisfies a predetermined threshold value, the candidate face image is determined as inappropriate as a master face image.

17 Claims, 3 Drawing Sheets

(56) References Cited

U.S. PATENT DOCUMENTS

| | | |
|---|---|---|
| 2005/0129290 A1 | 6/2005 | Lo et al. |
| 2006/0140460 A1 | 6/2006 | Coutts |
| 2013/0129160 A1 | 5/2013 | Yamada et al. |
| 2013/0329970 A1* | 12/2013 | Irie ............... G06V 40/172 |
| | | 382/118 |
| 2015/0205995 A1* | 7/2015 | Yamada ........... G06V 40/50 |
| | | 382/118 |
| 2019/0220652 A1* | 7/2019 | Li ................. G06F 21/32 |
| 2019/0347390 A1* | 11/2019 | Kim ............... G06N 7/01 |

FOREIGN PATENT DOCUMENTS

| | | | |
|---|---|---|---|
| JP | 2018147475 A | * | 9/2018 |
| WO | 2015/128939 A1 | | 9/2015 |

OTHER PUBLICATIONS

Menotti, David, et al. "Deep representations for iris, face, and fingerprint spoofing detection." IEEE Transactions on Information Forensics and Security 10.4 (2015): 864-879. (Year: 2015).*

Klare, Brendan F., and Anil K. Jain. "Face recognition: Impostor-based measures of uniqueness and quality." 2012 IEEE Fifth International Conference on Biometrics: Theory, Applications and Systems (BTAS). IEEE, 2012. (Year: 2012).*

International Search Report for PCT Application No. PCT/JP2019/033824, mailed on Nov. 19, 2019.

Singapore Office Action for Singapore Application No. 11202102275X, mailed on Jul. 24, 2022.

* cited by examiner

MASTER FACE IMAGE REGISTRATION APPARATUS, REGISTRATION METHOD, PROGRAM, AND RECORDING MEDIUM

This application is a National Stage Entry of PCT/JP2019/033824 filed on Aug. 29, 2019, which claims priority from Japanese Patent Application 2018-167127 filed on Sep. 6, 2018, the contents of all of which are incorporated herein by reference, in their entirety.

TECHNICAL FIELD

The present invention relates to a master face image registration apparatus, a registration method, a program, and a recording medium for face image authentication.

BACKGROUND ART

In various fields, personal authentication by face image analysis (hereinafter, referred to as face image authentication) is used. In the face image authentication, a face image of a registered person is stored in advance as a master face image, a face image of a person to be authenticated obtained live as a query image is collated with the master face image, and a person to be authenticated is authenticated as the registered person when the face image matches the master face image.

However, in face image authentication, a so-called false authentication may occur in which a person to be authenticated is authenticated as a registered person different from the person himself/herself to be authenticated. Therefore, suppression of false authentication is an important issue in face image authentication.

SUMMARY OF INVENTION

With the foregoing in mind, it is an object of the present invention to provide a new system for suppressing the occurrence of false authentication.

Solution to Problem

In order to achieve the aforementioned object, the present invention provides a master face image registration apparatus, including: an image information acquisition unit; a false authentication information extraction unit; a similarity determination unit; a score calculation unit; an aptitude determination unit; and an output unit, wherein the image information acquisition unit acquires a candidate face image and attribute information of an imaging attribute item related to imaging of the candidate face image in association with each other as candidate information of a master face image for face image authentication, the false authentication information extraction unit extracts attribute information on the same imaging attribute item as the candidate face image from a database that stores attribute information that is significantly participate in false authentication among attribute information of imaging attribute items of master face images resulting in false authentication in face image authentication, the similarity determination unit determines whether or not the extracted attribute information of the imaging attribute item is similar to the attribute information of the imaging attribute item of the master face image, when it is determined to be similar, the score calculation unit assigns a weight indicating a degree of participation in an occurrence of false authentication set for each imaging attribute item and calculates a total score by summing the weight for each imaging attribute, when the total score satisfies a predetermined threshold value, the aptitude determination unit determines that the candidate face image is inappropriate as a master face image, and when it is determined to be inappropriate, the output unit outputs a determination result indicating that the candidate face image is inappropriate as the master face image.

The present invention also provides a master face image registration method, including the steps of: acquiring image information; extracting false authentication information; determining similarity; calculating a score; determining an aptitude, and outputting, wherein the image information-acquiring acquires a candidate face image and attribute information of an imaging attribute item related to imaging of the candidate face image in association with each other as candidate information of a master face image for face image authentication, the false authentication information-extracting extracts attribute information on the same imaging attribute item as the candidate face image from a database that stores attribute information that is significantly participate in false authentication among attribute information of imaging attribute items of master face images resulting in false authentication in face image authentication, the similarity-determining determines whether or not the extracted attribute information of the imaging attribute item is similar to the attribute information of the imaging attribute item of the master face image, when it is determined to be similar, the score-calculating assigns a weight indicating a degree of participation in an occurrence of false authentication set for each imaging attribute item and calculates a total score by summing the weight for each imaging attribute, when the total score satisfies a predetermined threshold value, the aptitude-determining determines that the candidate face image is inappropriate as a master face image, and when it is determined to be inappropriate, the outputting outputs a determination result indicating that the candidate face image is inappropriate as the master face image.

The present invention also provides a program for a computer to execute the registration method according to the present invention.

The present invention also provides a computer readable recording medium with the program according to the present invention.

Advantageous Effects of Invention

According to the present invention, since it is possible to determine whether or not a master face image candidate has a possibility of causing false authentication, the candidate determined to be likely to cause false authentication can be prevented from being registered as a master face image. Therefore, as a result, for example, the occurrence of false authentication in face image authentication can be suppressed.

DESCRIPTION OF EXAMPLE EMBODIMENTS

Embodiments of the present invention will be described with reference to the drawings. Note here that the present invention is not limited to the following example embodiments. In the drawings, identical parts are indicated with identical reference signs. Each example embodiment can be described with reference to the descriptions of other example embodiments, unless otherwise specified, and the configurations of the example embodiments may be combined, unless otherwise specified.

First Example Embodiment

An example of the master face image registration apparatus and the registration method of the present invention will be described with reference to the drawings.

Figure 1:
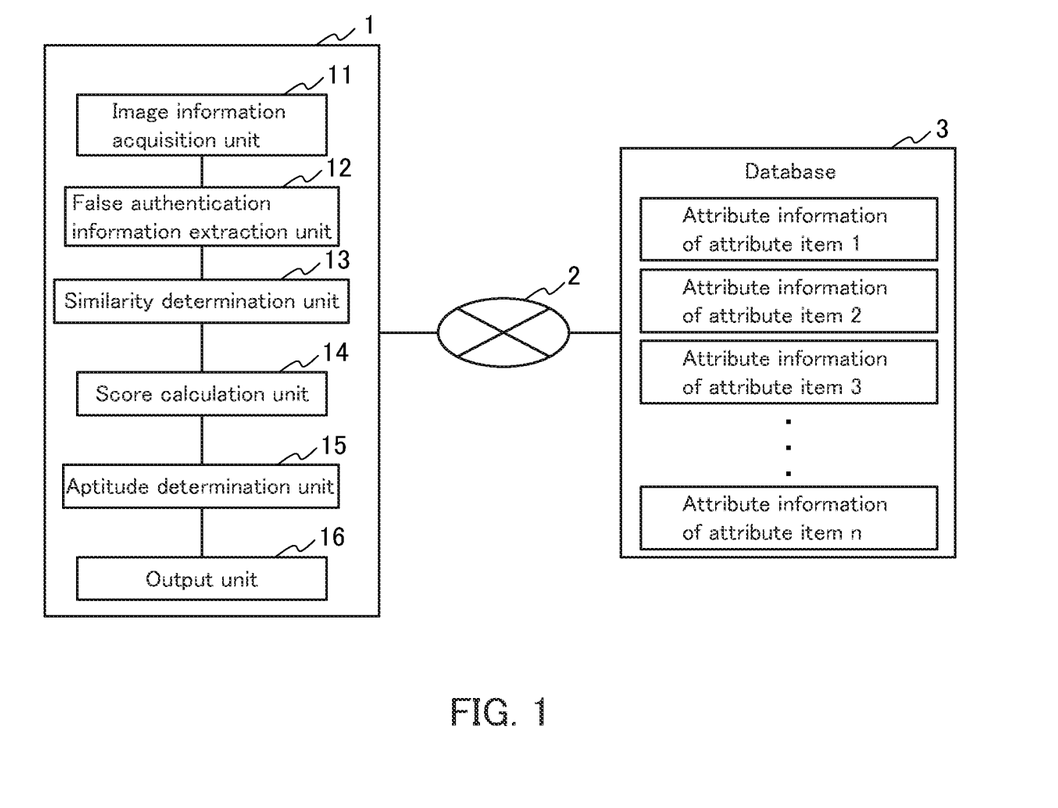
FIG. 1 is a block diagram showing an example of a registration apparatus according to the first example embodiment.

FIG. 1 is a block diagram showing a configuration of an example of a registration apparatus 1 according to the first example embodiment of the present invention. The registration apparatus 1 includes an image information acquisition unit 11, a false authentication information extraction unit 12, a similarity determination unit 13, a score calculation unit 14, an aptitude determination unit 15, and an output unit 16. The registration apparatus 1 is also referred to as a registration system, for example.

The registration apparatus 1 may be, for example, a single apparatus including the above-described components, or may be an apparatus to which the components are connectable via a communication network. The communication network is not particularly limited, and a known network can be used, and may be, for example, a wired network or a wireless network. Examples of the communication network include an Internet line, a telephone line, a local area network (LAN), and a wireless fidelity (WiFi). The registration apparatus 1 may be, for example, a personal computer (PC) in which the program of the present invention is installed.

For example, the registration apparatus 1 can be connected to a database 3 that stores attribute information of imaging attribute items of master face images resulting in false authentication in face image authentication, through a communication network 2. The communication network 2 is, for example, the same as described above. While the present example embodiment will be described with reference to an example in which the registration apparatus 1 and the database 3 are connected to each other via the communication network 2 as shown in FIG. 1, the present invention is not limited thereto. The registration apparatus of the present invention may further include a storage unit, for example. The storage unit may include, for example, a false authentication information storage unit that stores the database.

Figure 2:
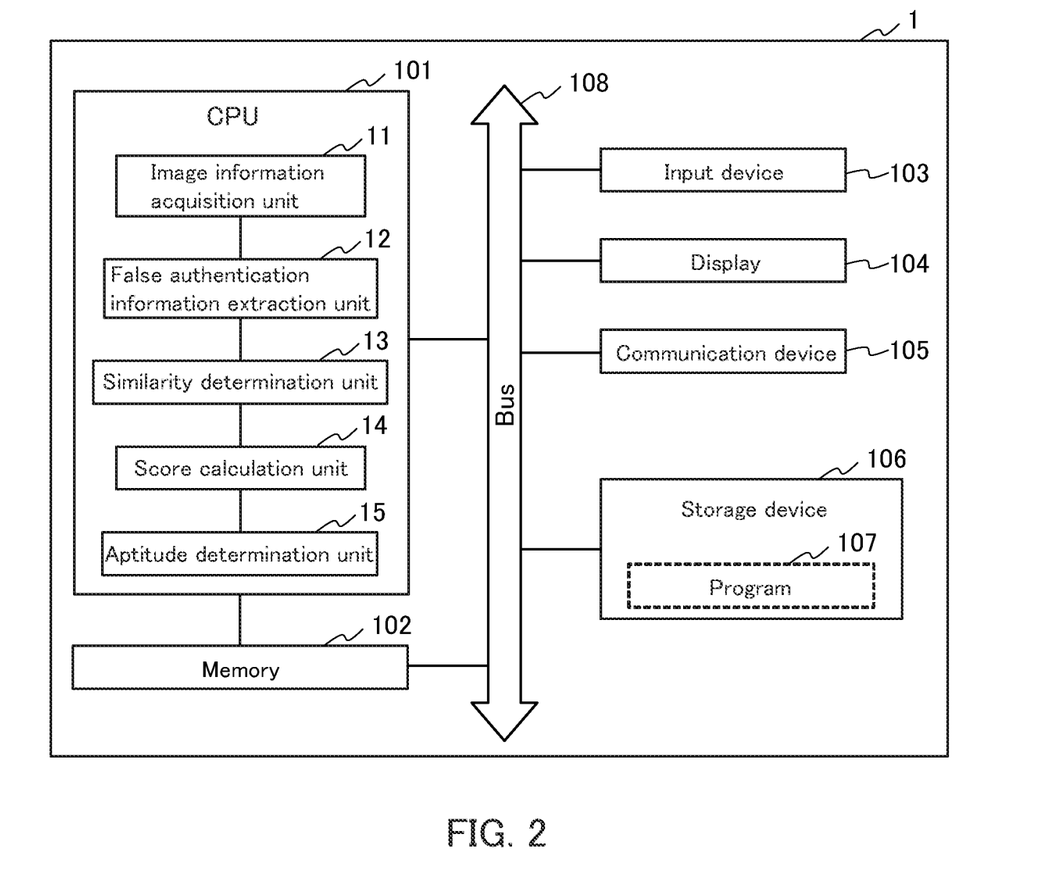
FIG. 2 is a block diagram showing an example of a hardware configuration of the registration apparatus according to the first example embodiment.

FIG. 2 is a block diagram illustrating a hardware configuration of the registration apparatus 1 of FIG. 1. The registration apparatus 1 includes, for example, a central processing unit (CPU) 101, a memory 102, an input device 103, a display 104, a communication device 105, a storage device 106, and the like. In the hardware configuration, the components are connected to each other via a bus 108 by, for example, respective interfaces (I/F).

The CPU 101 serves to control the entire registration apparatus 1. In the registration apparatus 1, the CPU 101 executes a program 107 including an operation program such as the program of the present example embodiment, and reads and writes various pieces of information, for example. Specifically, for example, the CPU 101 of the registration apparatus 1 functions as the image information acquisition unit 11, the false authentication information extraction unit 12, the similarity determination unit 13, the score calculation unit 14, and the aptitude determination unit 15.

The registration apparatus 1 can be connected to a communication network by, for example, a communication device 105 connected to the bus 108, and can also be connected to an external device via the communication network. The external device is not particularly limited, and examples thereof include an imaging device (e.g., a camera) for capturing a candidate face image as a master face image candidate and an external terminal in which the captured candidate face image is stored. Examples of the external terminal include a personal computer (PC), a tablet, and a smart phone. The connection method between the registration apparatus 1 and the external device is not particularly limited, and may be, for example, a wired connection or a wireless connection. The wired connection may be, for example, a cord connection or a cable connection for using a communication network. The wireless connection may be, for example, a connection using a communication network or a connection using wireless communication. The communication network is not particularly limited, and, for example, a known communication network can be used, which is the same as described above. The connection form between the registration apparatus 1 and the external device may be, for example, a USB or the like.

The memory 102 includes, for example, a main memory, and the main memory is also referred to as a main storage device. When the CPU 101 performs processing, the memory 102 reads various kinds of programs 107 such as the program of the present invention stored in an auxiliary storage device to be described below, and the CPU 101 receives data from the memory 102 and executes the program 107. The main memory is, for example, a random access memory (RAM). The memory 102 further includes, for example, a read-only memory (ROM).

The storage device 106 is also referred to as, for example, a so-called auxiliary storage device relative to the main memory (main storage device). The storage device 106 includes, for example, a storage medium and a drive for reading from and writing to the storage medium. The storage medium is not particularly limited, and may be, for example, a built-in type or an external type, and examples thereof include a hard disk (HD), a floppy® disk (FD), a CD-ROM, a CD-R, a CD-RW, an MO, a DVD, a flash memory, and a memory card. The drive is not particularly limited. Examples of the storage device 106 include a hard disk drive (HDD) in which the storage medium and the drive are integrated and a solid state drive (SSD). The storage device 106 stores, for example, the program 107 such as the program of the present invention. The storage device 106 is, for example, a storage unit such as the false authentication information storage unit, and stores, for example, the database.

The registration apparatus 1 further includes, for example, an input device 103 and a display 104. Examples of the input device 103 include a touch panel, a keyboard, and a mouse. Examples of the display 104 include an LED display and a liquid crystal display. The registration apparatus 1 may output the determination result to the display 104, or the registration apparatus 1 may be connected to the external device and output the determination result to the external device, for example.

Prior to the description of the registration apparatus 1, the database will be described. The database is a database that stores attribute information that is significantly participate in false authentication among attribute information of imaging attribute items of master face images resulting in false authentication in face image authentication.

The imaging attribute item is not particularly limited, and examples thereof include an attribute item related to a shooting condition of an image and an attribute item related to a captured image, and the item may include either one or both of them.

Examples of the attribute item of the shooting condition include a photographer, a location, a season, a period, a date, a time, a weather, a type of illumination, a distance, and a shooting method. The attribute item of the shooting condition may be one type and preferably two or more types, for example. The photographer is, for example, identification information for identifying the photographer, and specific examples thereof include a name and a nickname. The location is a shooting location, and examples thereof include an address, a name of a building, and a name of a facility. Examples of the season include spring, summer, autumn, and winter. Examples of the period include a month, the first ten days of month, the middle ten days month, and the last ten days of month. The date is a shooting date, and the time is a shooting time. The weather is, for example, sunny, cloudy, rainy, or the like. Example of the type of illumination include a fluorescent lamp, an LED, and a downlight. Examples of the distance include the distance between a camera and a subject, the distance between an illumination and a subject (may include a positional relationship, for example), and the distance between an illumination and a camera, and specifically, a combination of these distances, for example. Examples of the shooting method include pan, tilt, zoom, and lens type.

Examples of the attribute item of the captured image include the size of the face in the captured image and the inclination of the face in the captured image. The attribute item of the captured image may be one type and preferably two or more types, for example. The "size of the face" is, for example, an area of a face with respect to the entire captured image. The "inclination of the face" is, for example, a horizontal inclination of the face in the image, and specifically an inclination of the center line of the face with respect to the vertical direction of the image, for example.

In addition to these, examples of the attribute item of the shooting condition include a position from a face authentication point (also referred to as an authentication area). The authentication point means, for example, a point (area) to be imaged by the camera, and the position from the face authentication point means, for example, the position of the subject (face to be imaged) from the camera, that is, the distance from the camera to the subject.

The database can be generated as follows, for example, using machine learning. In the face image authentication, as described above, multiple master face images are registered in advance, and they are collated with a query face image. There is a case that, even when a certain master face image and the query face image are collated and personal identification is authenticated, the authentication is actually incorrect (false authentication). Therefore, by using the attribute conditions of the imaging attribute items of the multiple master face images in which false authentication has occurred in face image authentication as learning data and performing learning, attribute information that is significantly participate in false authentication is selected, and the selected attribute information is generated as a database of false authentication information. The generation of the database is not limited to machine learning, and may be artificially generated, for example, from statistics or the like.

Next, each component of the registration apparatus 1 will be described.

The image information acquisition unit 11 acquires a candidate face image and attribute information of an imaging attribute item related to imaging of the candidate face image in association with each other as candidate information of a master face image for face image authentication. The imaging attribute item is, for example, the same as described above, and it is preferable to acquire attribute information of a plurality of items.

The false authentication information extraction unit 12 extracts attribute information for the same imaging attribute item as the candidate face image from the database. The number of attribute information to be extracted is not particularly limited and, for example, may be two or more or all as long as the imaging attribute item is the same between the database and the candidate face image.

The similarity determination unit 13 determines whether or not the extracted attribute information of the imaging attribute item is similar to the attribute information of the imaging attribute item of the master face image. When multiple imaging attribute items are used, for example, the similarity or dissimilarity is determined for each of the imaging attribute items. "Similar" may include, for example, the meaning of "the same", and similarity may be, for example, "the same" or "not," or "the same or similar" or "dissimilar". The criterion for determining the similarity is not particularly limited, and can be set freely, and can be set for each imaging attribute item.

It is preferable that the criterion for determining the similarity corresponds to, for example, a condition of assigning a weight to be described below. The criterion for determining whether or not the imaging attribute items are similar is exemplified in the following Table 1, however, this is merely an example, and does not limit the present invention in any way. For example, the registration apparatus 1 may store the criterion for determining the similarity in the storage unit in advance.

| Imaging attribute item | Determination criteria (similarity) | Weight |
| --- | --- | --- |
| Location | Same | +2 |
| Season | Same | +1 |
| Time | Close | +1 |
| Weather | Seme | +1 |
| Type of illumination | Same | +1 |
| Shooting method (pan or tilt) | Close | +2 |
| Size of face in captured image | Similar | +1 |
| Inclination of face in image | Similar | +1 |

When it is determined to be similar by the similarity determination unit 13, the score calculation unit 14 assigns a weight indicating a degree of participation in an occurrence of false authentication set for each imaging attribute item and calculates a total score by summing the weight for each imaging attribute. The weight means the degree of participation of the imaging attribute item in the occurrence of the false authentication (e.g., the probability of the occurrence of the false authentication). The weight can be set freely, for example. For example, the higher the value of the weight, the higher the degree of participation in false authentication, and the lower the value of the weight, the lower the degree of participation in false authentication. When it is determined to be dissimilar by the similarity determination unit 13, the weight can be set to "zero".

While the weight of the imaging attribute item is exemplified in Table 1, this is merely an example and does not limit the present invention in any way. For example, the registration apparatus 1 may store the weight for each of the imaging attribute items in the storage unit in advance. In addition to these, the weight can also be assigned for the degree of matching with the database, for example. The degree of matching with the database means, for example, the degree of matching between the face image registered in the database and the face image to be registered. The weight may be set, for example, by machine learning.

The weight can be changed, for example, in accordance with the accumulation of the information of the master face images resulting in the false authentication. The weight may be independently set for each item, or may be set in combination with other items, for example. In the latter case, for example, the following examples are given. That is, while the weight "+2" is set when the location is the same and the weight "+1" is set when the season is the same in the specific example of Table 1, in the case where the captured image becomes a master face image resulting in the false authentication when the image is captured in a certain season at a certain location, the weight may be set so as to be large when both the specific location and the specific season are the same. In this manner, by reflecting the combination of the items, it is possible to make a more appropriate determination in the determination by the aptitude determination unit 15 to be described below. The weight can be changed for each item choice. That is, while the weight "+2" is set when the location is the same in the specific example of Table 1, in the case where the occurrence of the false authentication differs depending on the location, the weight "+2" may be set for a certain location when the location is the same or the weight "0" or "+1" may be set for another certain location even when the location is the same. By setting the weight based on the information accumulated in this manner, it is possible to make a more appropriate determination in the determination by the aptitude determination unit 15 to be described below.

A total score can be calculated for each candidate face image by summing the weights of the respective imaging attribute items for the candidate face image.

When the total score satisfies a predetermined threshold value, the aptitude determination unit 15 determines that the candidate face image is inappropriate as a master face image. For example, when the total score does not satisfy a predetermined threshold value, the aptitude determination unit 15 may determine that the candidate face image is registrable as a master face image. The threshold value is not particularly limited and can be set freely. The threshold value may be set relatively low when determining the possibility of false authentication relatively strictly, and the threshold value may be set relatively high when determining the possibility of false authentication relatively loosely.

When it is determined to be inappropriate, the output unit 16 outputs a determination result indicating that the candidate face image is inappropriate as a master face image. The output method is not particularly limited, and for example, the determination result may be displayed on the display 104 or may be output to an external device as described above. The determination result may be, for example, an alert for registration as a master face image, and the alert may display a character such as "unregistrable" on the display 104, or may output a sound indicating that registration is not possible.

The registration apparatus 1 may further include, for example, a master face image storage unit. For example, when the aptitude determination unit 15 determines that the candidate face image is appropriate as a master face image because the total score does not satisfy a predetermined threshold value, the master face image storage unit stores the candidate face image and the attribute information of the candidate face image in association with each other as master face image information. The master face image storage unit may store a face image which has been already used for face image authentication as a master face image together with attribute information of the imaging attribute item. In this case, the registration apparatus 1 may be referred to as a face image registration apparatus that determines whether or not the candidate face image is appropriate as the master face image and registers the candidate face image as the master face image.

Next, the registration method of the first example embodiment will be described. The registration method of the present example embodiment can be implemented using, for example, the registration apparatus 1 shown in FIGS. 1 and 2. The registration method according to the first example embodiment of the present invention is not limited to the use of the registration apparatus 1. Regarding the registration apparatus 1 described above, reference can be made to the description of the registration method of the present example embodiment.

In the registration method of the present example embodiment, the image information-acquiring acquires a candidate face image and attribute information of an imaging attribute item related to imaging of the candidate face image in association with each other as candidate information of a master face image for face image authentication. This process can be performed by, for example, the image information acquisition unit 11 of the registration apparatus 1.

In the registration method of the present example embodiment, the false authentication information-extracting extracts attribute information on the same imaging attribute item as the candidate face image from a database that stores attribute information that is significantly participate in false authentication among attribute information of imaging attribute items of master face images resulting in false authentication in face image authentication. This process can be performed by, for example, the false authentication information extraction unit 12 of the registration apparatus 1.

In the registration method of the present example embodiment, the similarity-determining determines whether or not the extracted attribute information of the imaging attribute item is similar to the attribute information of the imaging attribute item of the master face image. This process can be performed by, for example, the similarity determination unit 13 of the registration apparatus 1.

In the registration method of the present example embodiment, when it is determined to be similar, the score-calculating assigns a weight indicating a degree of participation in an occurrence of false authentication set for each imaging attribute item and calculates a total score by summing the weight for each imaging attribute. This process can be performed by, for example, the score calculation unit 14 of the registration apparatus 1.

In the registration method of the present example embodiment, when the total score satisfies a predetermined threshold value, the aptitude-determining determines that the candidate face image is inappropriate as a master face image. Further, for example, when the total score does not satisfy a predetermined threshold value, the aptitude-determining may determine that the candidate face image is registrable as a master face image. This process can be performed by, for example, the aptitude determination unit 15 of the registration apparatus 1.

In the registration method of the present example embodiment, when it is determined to be inappropriate, the outputting outputs a determination result indicating that the candidate face image is inappropriate as the master face image. This process can be performed by, for example, the output unit 16 of the registration apparatus 1.

Figure 3:
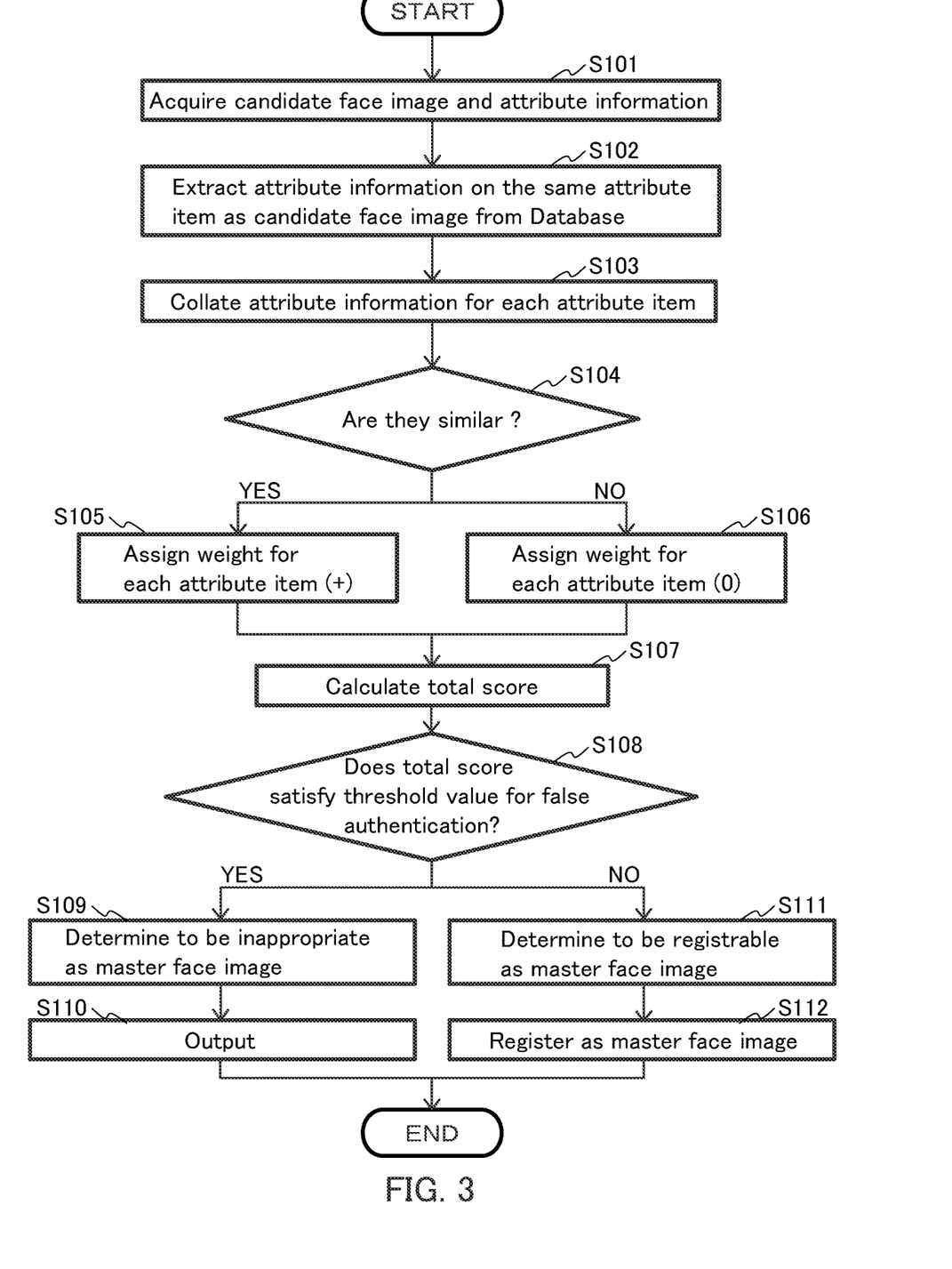
FIG. 3 is a flowchart showing an example of a registration method of the first example embodiment.

Next, the registration method according to the first example embodiment of the present invention will be described in more detail with reference to the flowchart of FIG. 3. Note that the registration method of the present invention is not limited to these examples. The flowchart will be described below with reference to the following conditions as an example. The present invention, however, is not limited thereto in any way.

First, a candidate face image and attribute information of the imaging attribute item related to imaging of the candidate face image are acquired in association with each other as candidate information of the master face image for face image authentication (S101).

Then, attribute information on the same imaging attribute item as the candidate face image is extracted from a database that stores attribute information that is significantly participate in false authentication among attribute information of imaging attribute items of master face images resulting in false authentication in face image authentication (S102). In this example, the face image is assumed to be an image of a face with a mask.

Next, for the imaging attribute item, the extracted attribute information and the attribute information of the master face image are collated (S103), and the similarity is determined for each imaging attribute item (S104). Similarity determination is performed based on, for example, Table 1. When the attribute information is similar (YES), a positive weight is assigned to the imaging attribute item based on, for example, Table 1 (S105), and when the attribute information is dissimilar (NO), no weight is assigned to the imaging attribute item (S106).

Then, a total score is calculated by summing the weight for each imaging attribute with respect to the candidate face image (S107).

Next, it is determined whether or not the total score satisfies a predetermined threshold value for false authentication (S108), and when the total score satisfies the predetermined threshold value for false authentication (YES), it is determined that the candidate face image is inappropriate as a master face image (S109), the determination result is output (S110), and the procedure is ended (END). On the other hand, when the total score does not satisfy the predetermined threshold value for false authentication (NO), it is determined that the candidate face image is registrable as the master face image (S111), the candidate face image is registered as the master face image (S112), and the procedure is ended (END). The threshold value as to whether or not there is a possibility of being a master face image resulting in false authentication can be set freely as described above.

According to the registration apparatus and the registration method of the present example embodiment, for example, by repeatedly performing the false authentication determination, it is possible to analyze, for example, a degree of influence of illuminance, a degree of influence of selection of a registered image of a person who has performed a certain registration, a degree of influence of a shooting time, and the like. Further, it is also possible to carry out count addition as a recommendation at the time of image registration and to promote alerts about registration.

Second Example Embodiment

The program of the present example embodiment is a program for a computer to execute the registration method of the first example embodiment. The program of the present example embodiment may be recorded on, for example, a computer readable recording medium. The recording medium is not particularly limited, and may be, for example, a storage medium as described above.

Third Example Embodiment

The present example embodiment relates to an example of the face authentication apparatus and the face authentication method of the present invention. The present example embodiment is similar to the registration apparatus and the registration method of the first example embodiment, unless otherwise mentioned, and reference can be made to the description of the first example embodiment.

The face authentication apparatus of the present example embodiment includes: a registration unit of a master face image for face image authentication; an acquisition unit of a query face image for face image authentication; and an authentication unit. The registration unit includes the registration apparatus according to the present invention, and registers a candidate face image, which has not been determined to be inappropriate as a master face image, as a master face image, the acquisition unit acquires a query face image, and the authentication unit collates the query face image with the registered master face image and authenticates personal identification if they match and does not authenticate personal identification if they do not match. The face authentication apparatus of the present example embodiment is characterized in that it determines whether or not a candidate face image is appropriate as a master face image, and other configurations are not limited in any way. The face authentication apparatus of the present example embodiment may be, for example, the registration apparatus of the first example embodiment, and the registration apparatus of the first example embodiment may further include the query image acquisition unit and the authentication unit to become a face authentication apparatus.

The face authentication method of the present example embodiment includes the steps of: registering a master face image for face image authentication; acquiring a query face image for face image authentication; and authenticating. The registering includes the registration method according to the present invention, and registers a candidate face image, which has not been determined to be inappropriate as a master face image, as a master face image, the acquiring acquires a query face image, and the authenticating collates the query face image with the registered master face image and authenticates personal identification if they match and does not authenticate personal identification if they do not match.

Fourth Example Embodiment

The program of the present example embodiment is a program for a computer to execute the face authentication method of the third example embodiment. The program of the present example embodiment may be recorded on, for example, a computer readable recording medium. The recording medium is not particularly limited, and may be, for example, a storage medium as described above.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2018-167127 filed on Sep. 6, 2018. The entire subject matter of the Japanese Patent Application is incorporated herein by reference.

(Supplementary Notes)

Some or all of the above example embodiments and examples may be described as in the following Supplementary Notes, but are not limited thereto.

(Supplementary Note 1)

A master face image registration apparatus, including:
  an image information acquisition unit;
  a false authentication information extraction unit;
  a similarity determination unit;
  a score calculation unit;
  an aptitude determination unit; and
  an output unit, wherein
  the image information acquisition unit acquires a candidate face image and attribute information of an imaging attribute item related to imaging of the candidate face image in association with each other as candidate information of a master face image for face image authentication,
  the false authentication information extraction unit extracts attribute information on the same imaging attribute item as the candidate face image from a database that stores attribute information that is significantly participate in false authentication among attribute information of imaging attribute items of master face images resulting in false authentication in face image authentication,
  the similarity determination unit determines whether or not the extracted attribute information of the imaging attribute item is similar to the attribute information of the imaging attribute item of the master face image,
  when it is determined to be similar, the score calculation unit assigns a weight indicating a degree of participation in an occurrence of false authentication set for each imaging attribute item and calculates a total score by summing the weight for each imaging attribute,
  when the total score satisfies a predetermined threshold value, the aptitude determination unit determines that the candidate face image is inappropriate as a master face image, and
  when it is determined to be inappropriate, the output unit outputs a determination result indicating that the candidate face image is inappropriate as the master face image.

(Supplementary Note 2)

The registration apparatus according to Supplementary Note 1, wherein
  when it is determined that the candidate face image is inappropriate as the master face image, the output unit outputs an alert for registration as the master face image.

(Supplementary Note 3)

The registration apparatus according to Supplementary Note 1 or 2, wherein
  the imaging attribute item includes at least one of an attribute item of a shooting condition or an attribute item of a captured image.

(Supplementary Note 4)

The registration apparatus according to Supplementary Note 3, wherein
  the attribute item of the shooting condition includes at least one selected from the group consisting of a photographer, a location, a season, a period, a date, a time, a weather, a type of illumination, a distance, and a shooting method.

(Supplementary Note 5)

The registration apparatus according to Supplementary Note 3 or 4, wherein
  the attribute item of the captured image includes at least one of a size of a face in the captured image or an inclination of the face in the image.

(Supplementary Note 6)

The registration apparatus according to any one of Supplementary Notes 1 to 5, further including:
  a master face image storage unit, wherein
  when the total score does not satisfy the predetermined threshold value, the aptitude determination unit determines that the candidate face image is appropriate as a master face image, and
  the master face image storage unit stores the candidate face image and attribute information of the candidate face image in association with each other as master face image information.

(Supplementary Note 7)

The registration apparatus according to any one of Supplementary Notes 1 to 6, further including:
  a false authentication information storage unit, wherein
  the false authentication information storage unit stores the database.

(Supplementary Note 8)

A master face image registration method, including the steps of:
  acquiring image information;
  extracting false authentication information;
  determining similarity;
  calculating a score;
  determining an aptitude, and
  outputting, wherein
  the image information-acquiring acquires a candidate face image and attribute information of an imaging attribute item related to imaging of the candidate face image in association with each other as candidate information of a master face image for face image authentication,
  the false authentication information-extracting extracts attribute information on the same imaging attribute item as the candidate face image from a database that stores attribute information that is significantly participate in false authentication among attribute information of imaging attribute items of master face images resulting in false authentication in face image authentication,
  the similarity-determining determines whether or not the extracted attribute information of the imaging attribute item is similar to the attribute information of the imaging attribute item of the master face image,
  when it is determined to be similar, the score-calculating assigns a weight indicating a degree of participation in an occurrence of false authentication set for each imaging attribute item and calculates a total score by summing the weight for each imaging attribute, when the total score satisfies a predetermined threshold value, the aptitude-determining determines that the candidate face image is inappropriate as a master face image, and when it is determined to be inappropriate, the outputting outputs a determination result indicating that the candidate face image is inappropriate as the master face image.

(Supplementary Note 9)

The registration method according to Supplementary Note 8, wherein when it is determined that the candidate face image is inappropriate as the master face image, the outputting outputs an alert for registration as the master face image.

(Supplementary Note 10)

The registration method according to Supplementary Note 8 or 9, wherein the imaging attribute item includes at least one of an attribute item of a shooting condition or an attribute item of a captured image.

(Supplementary Note 11)

The registration method according to Supplementary Note 10, wherein the attribute item of the shooting condition includes at least one selected from the group consisting of a photographer, a location, a season, a period, a date, a time, a weather, a type of illumination, a distance, and a shooting method.

(Supplementary Note 12)

The registration method according to Supplementary Note 10 or 11, wherein the attribute item of the captured image includes at least one of a size of a face in the captured image or an inclination of the face in the image.

(Supplementary Note 13)

The registration method according to any one of Supplementary Notes 8 to 12, further including the step of:

storing a master face image, wherein when the total score does not satisfy the predetermined threshold value, the aptitude-determining determines that the candidate face image is appropriate as a master face image, and the master face image-storing stores the candidate face image and attribute information of the candidate face image in association with each other as master face image information.

(Supplementary Note 14)

The method according to any one of Supplementary Notes 8 to 13, further including the step of:

storing false authentication information, wherein the false authentication information-storing stores the database.

(Supplementary Note 15)

A program for a computer to execute the method according to any one of Supplementary Notes 8 to 14.

(Supplementary Note 16)

A computer readable recording medium with the program according to Supplementary Note 15.

(Supplementary Note 17)

A face image authentication apparatus, including:

a registration unit of a master face image for face image authentication;

an acquisition unit of a query face image for face image authentication; and an authentication unit, wherein the registration unit includes the registration apparatus according to any one of Supplementary Notes 1 to 7, and registers a candidate face image, which has not been determined to be inappropriate as a master face image, as a master face image, the acquisition unit acquires a query face image, and the authentication unit collates the query face image with the registered master face image and authenticates personal identification if they match and does not authenticate personal identification if they do not match.

(Supplementary Note 18)

A face image authentication method, including the steps of:

registering a master face image for face image authentication;

acquiring a query face image for face image authentication; and authenticating, wherein the registering includes the registration method according to any one of Supplementary Notes 8 to 14, and registers a candidate face image, which has not been determined to be inappropriate as a master face image, as a master face image, the acquiring acquires a query face image, and the authenticating collates the query face image with the registered master face image and authenticates personal identification if they match and does not authenticate personal identification if they do not match.

(Supplementary Note 19)

A program for a computer to execute the method according to Supplementary Note 18.

(Supplementary Note 20)

A computer readable recording medium with the program according to Supplementary Note 19.

INDUSTRIAL APPLICABILITY

According to the present invention, since it is possible to determine whether or not a master face image candidate has a possibility of causing false authentication, the candidate determined to be likely to cause false authentication can be prevented from being registered as a master face image. Therefore, as a result, for example, the occurrence of false authentication in face image authentication can be suppressed.

REFERENCE SIGNS LIST

1: registration apparatus
11: image information acquisition unit
12: false authentication information extraction unit
13: similarity determination unit
14: score calculation unit
15: aptitude determination unit
16: output unit

What is claimed is:

1. An apparatus for master face image registration, comprising at least one processor configured to:

acquire a candidate face image and attribute information of each of a plurality of imaging attribute items related to imaging of the candidate face image in association with each other as candidate information of a master face image for face image authentication in which an input face image is authenticated by comparison to the master face image, for each imaging attribute item, extract attribute information on the imaging attribute item from a database of false authentication information among attribute information of analyzed imaging attribute items of analyzed master face images that resulted in false authentication in face image authentication, wherein the database of false authentication information stores attribute information that has a degree of participation in false authentication greater than a participation degree threshold, for each imaging attribute item, determine whether or not the extracted attribute information has a similarity to the attribute information of the imaging attribute item of the master face image greater than a similarity threshold, for each imaging attribute item for which the determined similarity is greater than the similarity threshold, assign a weight indicating the degree of participation in an occurrence of false authentication set for the imaging attribute item, calculate a total score by summing the weight for each imaging attribute item, when the total score satisfies a predetermined threshold value, determine that the candidate face image is inappropriate as the master face image, and when the candidate face image has been determined as being inappropriate as the master face image, output a determination result indicating that the candidate face image is inappropriate as the master face image, such that the candidate face image is not registered as the master face image for usage in face image authentication, and such that occurrence of false positives in face image authentication is reduced.

2. The registration apparatus according to claim 1, wherein the processor is configured to:
when the candidate face image has been determined as being inappropriate as the master face image, output an alert for registration as the master face image.

3. The registration apparatus according to claim 1, wherein
each imaging attribute item includes at least one of an attribute item of a shooting condition or an attribute item of a captured image.

4. The registration apparatus according to claim 3, wherein
the attribute item of the shooting condition includes at least one selected from the group consisting of a photographer, a location, a season, a period, a date, a time, a weather, a type of illumination, a distance, and a shooting method.

5. The registration apparatus according to claim 3, wherein
the attribute item of the captured image includes at least one of a size of a face in the captured image or an inclination of the face in the captured image.

6. The registration apparatus according to claim 1, further comprising a storage, wherein the at least one processor is configured to:
when the total score does not satisfy the predetermined threshold value, determine that the candidate face image is appropriate as the master face image, and
the storage is configured to store the candidate face image and the attribute information of the candidate face image in association with each other as master face image information.

7. The registration apparatus according to claim 1, further comprising a storage configured to store the database.

8. A method for a master face image registration performed by a computer and comprising:
acquiring a candidate face image and attribute information of each of a plurality of imaging attribute items related to imaging of the candidate face image in association with each other as candidate information of a master face image for face image authentication in which an input face image is authenticated by comparison to the master face image, for each imaging attribute item, extracting attribute information on the imaging attribute item from a database of false authentication information among attribute information of analyzed imaging attribute items of analyzed master face images that resulted in false authentication in face image authentication, wherein the database of false authentication information stores attribute information that has a degree of participation in false authentication greater than a participation degree threshold, for each imaging attribute item, determining whether or not the extracted attribute information has a similarity to the attribute information of the imaging attribute item of the master face image greater than a similarity threshold, for each imaging attribute item for which the determined similarity is greater than the similarity threshold, assigning a weight indicating the degree of participation in an occurrence of false authentication set for the imaging attribute item, calculating a total score by summing the weight for each imaging attribute item, when the total score satisfies a predetermined threshold value, determining that the candidate face image is inappropriate as the master face image, and when the candidate face image has been determined as being inappropriate as the master face image, outputting a determination result indicating that the candidate face image is inappropriate as the master face image, such that the candidate face image is not registered as the master face image for usage in face image authentication, and such that occurrence of false positives in face image authentication is reduced.

9. The method according to claim 8, wherein
when the candidate face image has been determined as being inappropriate as the master face image, outputting an alert for registration as the master face image.

10. The method according to claim 8, wherein
each imaging attribute item includes at least one of an attribute item of a shooting condition or an attribute item of a captured image.

11. The method according to claim 10, wherein
the attribute item of the shooting condition includes at least one selected from the group consisting of a photographer, a location, a season, a period, a date, a time, a weather, a type of illumination, a distance, and a shooting method.

12. The method according to claim 10, wherein
the attribute item of the captured image includes at least one of a size of a face in the captured image or an inclination of the face in the captured image.

13. The method according to claim 8, further comprising:
when the total score does not satisfy the predetermined threshold value, determining that the candidate face image is appropriate as the master face image, and
storing the candidate face image and the attribute information of the candidate face image in association with each other as master face image information.

14. The method according to claim 8, further comprising: storing the database.

15. A non-transitory computer readable recording medium storing a program executable by a computer to perform a method for a master face image registration, the method comprising:
- acquiring a candidate face image and attribute information of each of a plurality of imaging attribute items related to imaging of the candidate face image in association with each other as candidate information of a master face image for face image authentication in which an input face image is authenticated by comparison to the master face image,
- for each imaging attribute item, extracting attribute information on the imaging attribute item from a database of false authentication information among attribute information of analyzed imaging attribute items of analyzed master face images that resulted in false authentication in face image authentication, wherein
- the database of false authentication information stores attribute information that has a degree of participation in false authentication greater than a participation degree threshold,
- for each imaging attribute item, determining whether or not the extracted attribute information has a similarity to the attribute information of the imaging attribute item of the master face image greater than a similarity threshold,
- for each imaging attribute item for which the determined similarity is greater than the similarity threshold, assigning a weight indicating the degree of participation in an occurrence of false authentication set for the imaging attribute item,
- calculating a total score by summing the weight for each imaging attribute item,
- when the total score satisfies a predetermined threshold value, determining that the candidate face image is inappropriate as the master face image, and
- when the candidate face image has been determined as being inappropriate as the master face image, outputting a determination result indicating that the candidate face image is inappropriate as the master face image, such that the candidate face image is not registered as the master face image for usage in face image authentication, and such that occurrence of false positives in face image authentication is reduced.

16. An apparatus for face image authentication, comprising the apparatus according to claim 1, wherein the at least one processor configured to:
- when the candidate face image has not been determined as being inappropriate as the master face image, register the candidate face image as the master face image,
- acquire a query face image,
- collate the query face image with the registered master face image,
- authenticate personal identification if the query face image and the registered master face image match, and
- do not authenticate the personal identification if the query face image and the registered master face image do not match.

17. A computer-implemented method for face image authentication, comprising the method according to claim 8, and further comprising:
- when the candidate face image has not been determined as being inappropriate as the master face image, registering the candidate face image as the master face image,
- acquire a query face image,
- collate the query face image with the registered master face image,
- authenticate personal identification if the query face image and the registered master face image match, and
- do not authenticate the personal identification if the query face image and the registered master face image do not match.

* * * * *